(12) United States Patent
Duhaime et al.

(10) Patent No.: US 10,543,748 B2
(45) Date of Patent: Jan. 28, 2020

(54) HYBRID TRANSMISSION FOR A MOTOR VEHICLE

(71) Applicants: Michael L Duhaime, Northville, MI (US); Michael B Solt, Oxford, MI (US); Gurunath S Kedar-Dongarkar, Rochester Hills, MI (US); Robert S Smyczynski, Clarkston, MI (US); Ali Sarikhani, Rochester Hills, MI (US); Cody J Rhebergen, Clawson, MI (US); Sachin A Bhide, Auburn Hills, MI (US); Tejinder Singh, Dexter, MI (US)

(72) Inventors: Michael L Duhaime, Northville, MI (US); Michael B Solt, Oxford, MI (US); Gurunath S Kedar-Dongarkar, Rochester Hills, MI (US); Robert S Smyczynski, Clarkston, MI (US); Ali Sarikhani, Rochester Hills, MI (US); Cody J Rhebergen, Clawson, MI (US); Sachin A Bhide, Auburn Hills, MI (US); Tejinder Singh, Dexter, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/124,924

(22) Filed: Sep. 7, 2018

(65) Prior Publication Data

US 2019/0078666 A1     Mar. 14, 2019

Related U.S. Application Data

(60) Provisional application No. 62/556,622, filed on Sep. 11, 2017.

(51) Int. Cl.
*F16H 3/72*     (2006.01)
*B60K 25/06*     (2006.01)
(Continued)

(52) U.S. Cl.
CPC .............. *B60K 25/06* (2013.01); *B60K 6/365* (2013.01); *B60K 6/383* (2013.01); *B60K 6/387* (2013.01);
(Continued)

(58) Field of Classification Search
CPC ........ B60K 25/06; B60K 6/387; B60K 17/28; B60K 2025/005; B60K 2006/381;
(Continued)

(56) References Cited

U.S. PATENT DOCUMENTS 7,008,346 B2    3/2006   Stevenson
7,018,318 B2    3/2006   Klemen et al.
(Continued)

OTHER PUBLICATIONS

International Search Report and Written Opinion dated Dec. 13, 2018 for International Application No. PCT/US2018/050179, International Filing Date Sep. 10, 2018.

*Primary Examiner* — Jeffrey A Shapiro
(74) *Attorney, Agent, or Firm* — Ralph E Smith

(57) ABSTRACT

A transmission includes input and output shafts, a hybrid module coupled to the input shaft and a gearbox coupled to the module and output shaft. The hybrid module includes a first electric motor under driven by a gearset; a second electric motor coupled to a module output, a disconnect clutch coupled to the gearset and selectively to the input shaft; and a launch clutch coupled to the disconnect clutch and selectively to the module output. The gearbox includes three gearsets and five torque transmitting devices operable to generate six forward speeds. One torque transmitting device is a clutch brake applied with a piston that reaches over a park gear, and one is a selectable one way clutch. Two of the torque transmitting devices are radially stacked rotating clutches. The transmission includes and/or facilitates an engine only mode, an electric only mode, a hybrid mode and a battery charging mode.

21 Claims, 8 Drawing Sheets

(51) Int. Cl.
  *B60K 6/547* (2007.10)
  *B60K 6/383* (2007.10)
  *B60K 6/365* (2007.10)
  *B60K 6/405* (2007.10)
  *B60K 6/442* (2007.10)
  *B60K 6/40* (2007.10)
  *B60K 6/387* (2007.10)
  *B60K 17/28* (2006.01)
  *B60W 10/08* (2006.01)
  *B60W 20/40* (2016.01)
  *B60W 30/188* (2012.01)
  *F16H 3/66* (2006.01)
  *F16H 61/00* (2006.01)
  *B60K 6/38* (2007.10)
  *B60K 25/00* (2006.01)

(52) U.S. Cl.
  CPC ............... *B60K 6/40* (2013.01); *B60K 6/405* (2013.01); *B60K 6/442* (2013.01); *B60K 6/547* (2013.01); *B60K 17/28* (2013.01); *B60W 10/08* (2013.01); *B60W 20/40* (2013.01); *B60W 30/1888* (2013.01); *F16H 3/724* (2013.01); *F16H 3/727* (2013.01); *B60K 2006/381* (2013.01); *B60K 2025/005* (2013.01); *B60Y 2200/14* (2013.01); *F16H 3/66* (2013.01); *F16H 3/666* (2013.01); *F16H 61/0028* (2013.01); *F16H 2200/0052* (2013.01); *F16H 2200/201* (2013.01); *F16H 2200/2041* (2013.01); *F16H 2200/2043* (2013.01); *F16H 2200/2066* (2013.01); *F16H 2200/2082* (2013.01)

(58) Field of Classification Search
  CPC .......... B60K 6/365; B60K 6/383; B60K 6/40; B60K 6/405; B60K 6/442; B60K 6/547; B60W 10/08; B60W 20/40; B60W 30/1888; F16H 3/724; F16H 3/727; F16H 3/666; F16H 2200/0052; F16H 2200/201; F16H 2200/2041; F16H 2200/2043; F16H 3/66; F16H 2200/2066; F16H 61/0028; F16H 2200/2082; B60Y 2200/14
  See application file for complete search history.

(56) References Cited

U.S. PATENT DOCUMENTS

| | | |
|---|---|---|
| 7,108,628 B2 | 9/2006 | Ziemer et al. |
| 7,344,470 B2 | 3/2008 | Adolf et al. |
| 7,354,376 B2 | 4/2008 | Rihn et al. |
| 9,182,013 B2 | 11/2015 | Gumpoltsberger et al. |
| 2006/0048516 A1 | 3/2006 | Tenbrock et al. |
| 2008/0255748 A1 | 10/2008 | Kumazaki et al. |
| 2009/0321157 A1 | 12/2009 | Sowul et al. |
| 2010/0063693 A1 | 3/2010 | Lee et al. | though; its application or uses. Thus, variations that do not depart
HYBRID TRANSMISSION FOR A MOTOR VEHICLE

CROSS REFERENCE TO RELATED APPLICATION

This application claims the benefit of U.S. Provisional Application Ser. No. 62/556,622, filed Sep. 11, 2017, the contents of which are incorporated herein by reference thereto.

FIELD

The present application relates generally to a hybrid powertrain for a vehicle and, more particularly, to a hybrid automatic transmission for a motor vehicle, where the hybrid transmission includes two electric motors coupled to an input of the hybrid transmission.

BACKGROUND

Current hybrid automatic transmissions are often very complex assemblies that include multiple electric motors, compound planetary gear sets and over six clutches or brakes. Such assemblies are expensive to develop and manufacture, and are often oversized from both an overall size and a capacity perspective. Such hybrid transmissions can be too large for vehicles in which they are desired to be incorporated and/or may be over-capacitized for vehicles in which they are incorporated, thereby potentially cutting into fuel economy savings with extra weight and/or inefficiencies due to the transmission complexity. This can also result in unnecessary cost and weight being associated with such vehicles. Thus, while such hybrid transmissions do work well for their intended purpose, there remains a desire for improvement in the relevant art.

SUMMARY

In accordance with one example aspect of the invention, a multi-speed hybrid automatic transmission for a vehicle is provided. In one exemplary implementation, the transmission includes a transmission input shaft, a transmission output shaft, a hybrid module coupled to the input shaft and a multi-speed gearbox assembly coupled to the hybrid module and the output shaft. In this exemplary implementation, the hybrid module includes a first electric motor coupled to and underdriven by a module planetary gear set; a second electric motor coupled to an output of the hybrid module; a disconnect clutch controllable to selectively couple a separate torque generating device to the hybrid module, where the disconnect clutch is connected to the module planetary gear set and selectively to the transmission input shaft, which forms an input to the hybrid module; a launch clutch controllable to selectively couple the hybrid module to the gearbox assembly, where the launch clutch is coupled for common rotation with the disconnect clutch and selectively to the output of the hybrid module, which forms an input to the gearbox assembly; and a pump drive coupled for common rotation with the module planetary gear set. In this example, the gearbox assembly includes three planetary gear sets and five torque transmitting devices operable to generate six forward speed ratios and reverse, where one of the five torque transmitting devices is a selectively controllable one-way clutch. The gearbox assembly input is coupled to a second planetary gear set of the three planetary gear sets and selectively coupled to one of two rotating clutches of the five torque transmitting devices. An output of the gearbox assembly, which forms the transmission output shaft, and is coupled to a third planetary gear set of the three planetary gear sets. The hybrid transmission is configured to be controlled to operate in an engine only propulsion mode, two electric only propulsion modes, a hybrid propulsion mode and a battery charging mode.

Further areas of applicability of the teachings of the present application will become apparent from the description and the drawings provided hereinafter. It should be understood that the description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
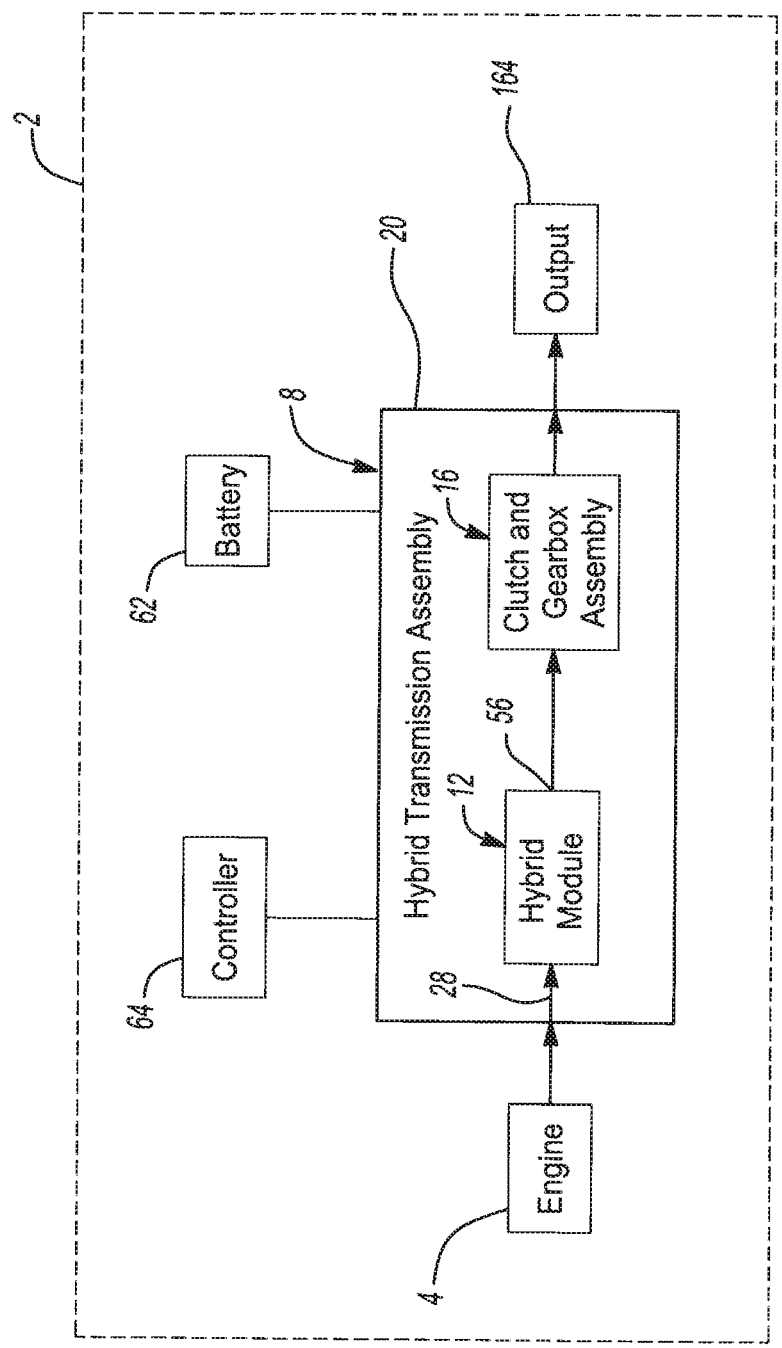
FIG. 1 is schematic illustration of an example implementation of a hybrid powertrain including a hybrid automatic transmission assembly in accordance with the principles of the present application.
Figure 2:
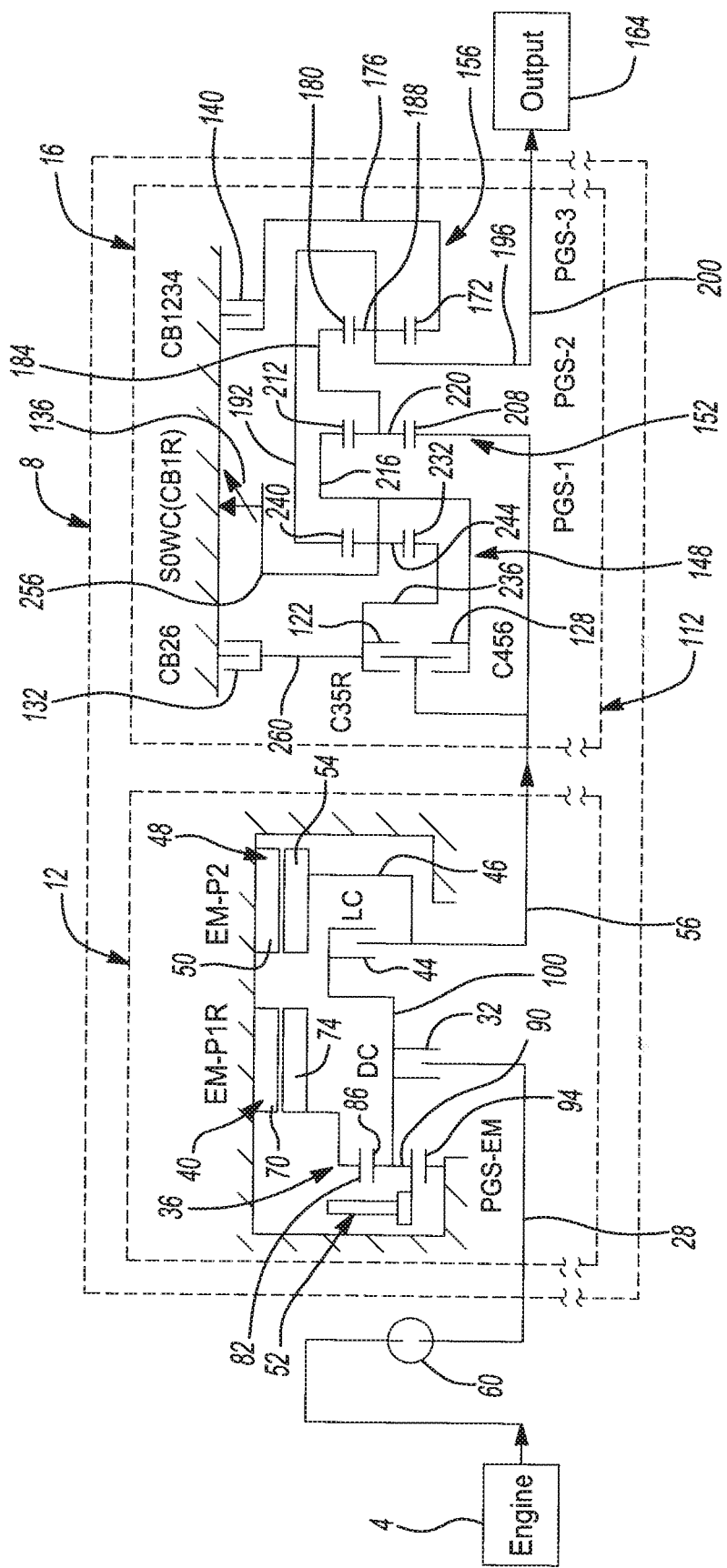
FIG. 2 is an example schematic illustration of the example hybrid automatic transmission assembly of FIG. 1 in accordance with the principles of the present application.
Figure 3:
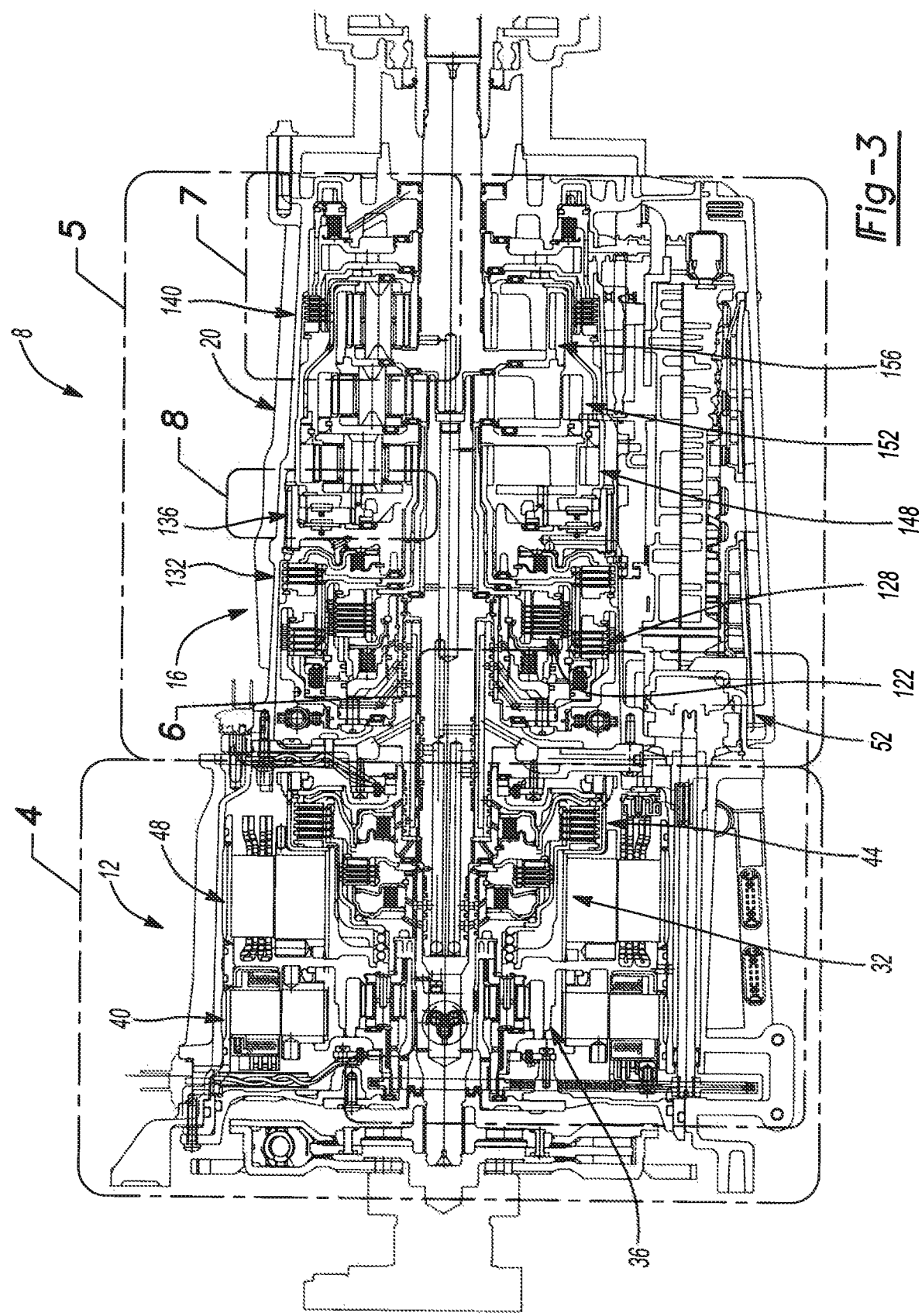
FIG. 3 is an example cross-sectional view of the example hybrid automatic transmission assembly of FIGS. 1 and 2 in accordance with the principles of the present application.
Figure 4:
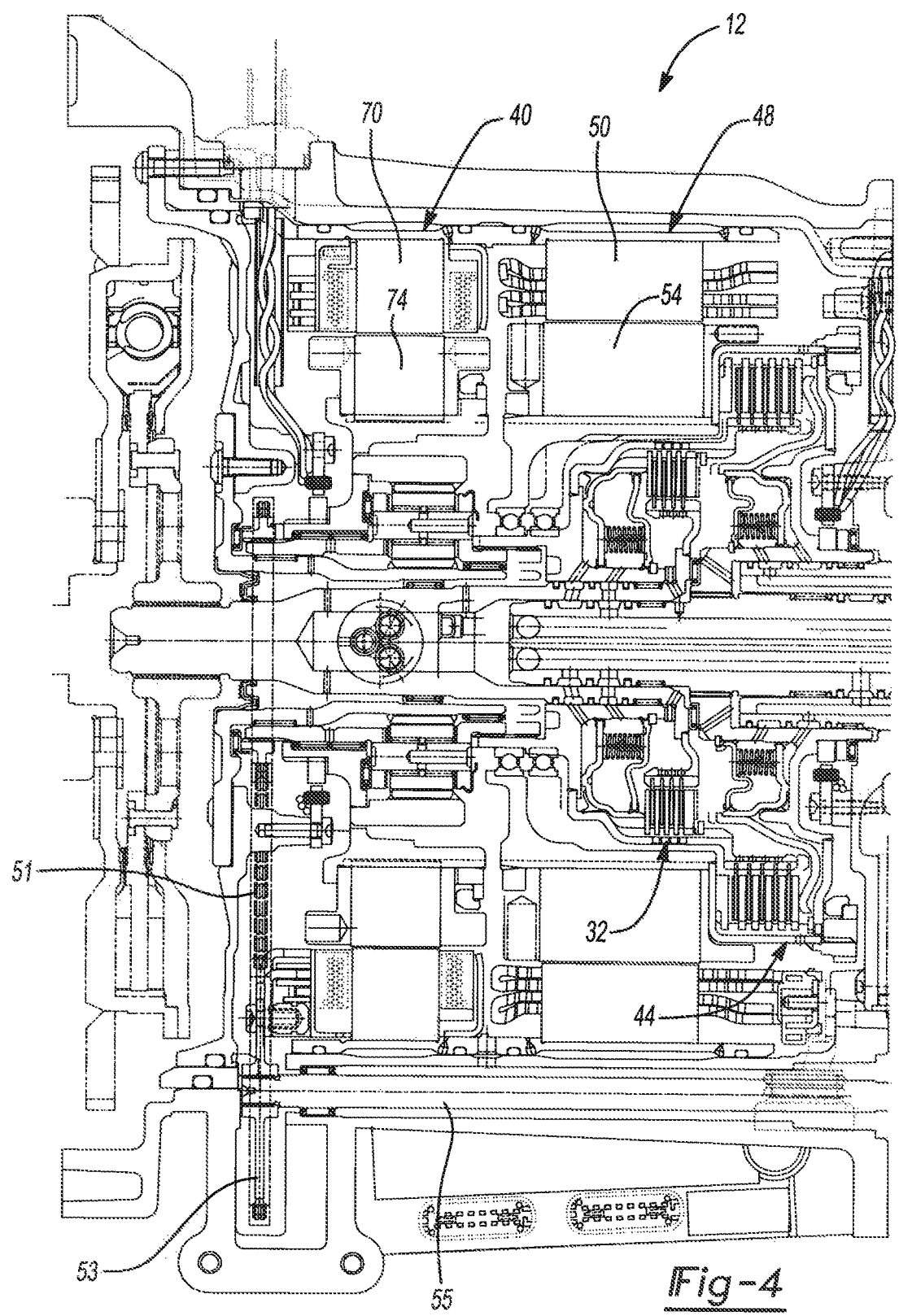
FIG. 4 is an enlarged view of the encircled area 4 in FIG. 3 in accordance with the principles of the present application.

In accordance with an example aspect of the invention and as will be discussed in greater detail herein, the hybrid powertrain of a vehicle 2 includes an engine or prime mover 4, a hybrid automatic transmission assembly 8 and a driveline including a final drive unit, as generally shown in FIGS. 1-3. In this exemplary implementation, the hybrid transmission assembly or arrangement 8 may be referred to as a "P1r/P2" type hybrid automatic transmission assembly/arrangement and includes, in one exemplary implementation, a hybrid module 12 coupled to a clutch and gearbox assembly 16, both of which are housed, among other components of transmission assembly 8, inside transmission housing 20.

In the exemplary implementation illustrated in FIGS. 1-9, the hybrid automatic transmission assembly 8 includes six forward speeds/gears and reverse, and is configured for an all-wheel drive/rear wheel drive vehicle 2 configuration. In one exemplary implementation, hybrid automatic transmission assembly 8 includes only six forward speeds in an effort to reduce an overall axial length of the transmission 8. The hybrid automatic transmission assembly 8 is configured to operate in various modes, including an electric vehicle (EV) mode, an engine on only mode, a battery charging at vehicle stop mode, and a hybrid mode (engine plus electric machine on mode), as will be discussed in greater detail below.

In the illustrated exemplary implementation of transmission assembly 8, the hybrid module 12 includes an input 28, a disconnect clutch 32, a planetary gear set 36, a first electric motor or machine (P1r) 40, a launch clutch 44, a second electric machine or motor (P2) 48, a pump 52 and an output 56, as shown for example in FIGS. 1 and 2. A damper system 60 is also provided between the engine and the hybrid module 12. In this exemplary implementation, the input 28 to the hybrid module 12 forms an input to the hybrid automatic transmission assembly 8. Similarly, the output 56 of the hybrid module 12 forms an input to the clutch and gearbox assembly 16, and may also be referenced as the transmission input shaft. Also in this implementation, the output 56 (or transmission shaft) forms the only torque carrying connection between the hybrid module 12 and the clutch and gearbox assembly 16. It will be appreciated by those skilled in the art that the transmission includes other features and components for use in its overall operation.

In the illustrated example implementation, the hybrid transmission assembly 8, and in particular, the first and second electric motors 40, 48, are electrically coupled to a battery or battery system 62 in a manner known in the art. A controller 64 is in signal communication with the transmission assembly 8 and, in particular, the hybrid module 12 and first and second electric motors 40, 48, and the battery system 62, and is configured to control the same as well as the launch clutch 44, the disconnect clutch 32 and the five torque transmitting devices and other functions and components of the clutch and gearbox assembly 16. As also illustrated in FIG. 1, the controller 64 is in signal communication with the engine 4. It will be appreciated that the controller 64 can be a single controller or multiple controllers in signal communication with each other, such as through a can bus.

In one exemplary implementation, the first electric machine 40 is coupled to the planetary gear set 36 such that the first electric machine 40 is underdriven by the planetary gear set 36. This planetary gear reduction provides for, among other benefits and features, reducing the size of the electric machine or motor 40, thereby providing for a smaller size transmission package and a reduction in mass of the transmission. In one exemplary implementation, this planetary gear set 36 is a simple planetary gear set.

The first electric machine 40 generally includes a stator 70 and a rotor 74. In one exemplary implementation, the stator 70 includes a plurality of windings or phases and is secured to a stationary member, such as the transmission housing 20. The rotor 74, in one exemplary implementation, includes a plurality of magnets and/or ferromagnetic members and is disposed radially inwardly of the stator 70, as shown in various figures of the application. It will be appreciated that the rotor 74 may also comprise other construction configurations.

In the exemplary implementation illustrated, the rotor 74 of the first electric machine or motor 40 is coupled to a ring gear 82 of planetary gear set 36, which is coupled through pinion gears 86 to a carrier 90, which is coupled through the pinion gears 86 to the sun gear 94. The carrier 90 is coupled to a connecting shaft or member 100, to which the disconnect and launch clutches 32, 44 are separately, non-rotatably connected, as shown for example in FIGS. 2 and 3. In one exemplary implementation, the disconnect and launch clutches 32, 44 are connected to the connecting shaft 100 in a serial arrangement with the launch clutch 44 being downstream (further from the engine 4) of the disconnect clutch 32 and both clutch connections with shaft/member 100 being between the first and second electric motors 40, 48 and downstream of the pump 52 connection to the planetary gear set 36. The sun gear 94 of the planetary gear set 36 is connected to ground, such as to the transmission housing 20, as shown in, for example, FIGS. 2 and 3. The pump 52 is non-rotatably connected to the carrier assembly 90 for common rotation therewith, as will be discussed in greater detail below.

The second electric machine 48 is coupled to an inset gear 46, which is non-rotatably coupled to the transmission input shaft 56 proximate the selectable connection of this shaft to the launch clutch 44. The inset gear 46 provides for, among other benefits, gear reduction which allows use of a smaller P2 motor 48 and thus reducing the size and mass of the motor 48 and packaging space needed in the transmission assembly 8.

In summary, the first electric machine 40 is connected to the crankshaft of the engine 4 through the disconnect clutch 32. The first electric machine 40 is also connected to the second electric machine 48 through the launch clutch 44. The second electric machine 48 is connected to the input shaft 56 of the clutch and gearbox assembly (transmission) 16. In one exemplary implementation, the second electric machine 48 is non-disconnectably connected to the input shaft 56 of the transmission downstream of the launch clutch 44. In one exemplary implementation, the second electric machine 48 is connected to the input shaft 56 of the transmission 16 for continuous rotation therewith. In these arrangements, each electric machine 40, 48 includes a unique ratio to the input of the transmission 16, which allows for optimization of electric motor design and sizing (torque/power/speed ratings) based on a specific application thereby making the transmission modular.

Turning now to the clutch and gearbox assembly 16, this assembly includes, in one exemplary implementation, three planetary gear sets 112 and five torque transmitting devices configured to be selectively controlled to generate six forward gears or speed ratios and reverse, as will be discussed in greater detail below. In one exemplary implementation, the three planetary gear sets 112 are simple planetary gear sets. In one exemplary implementation, the three planetary gear sets 112 are separate, simple planetary gear sets arranged generally spaced apart from each other along a longitudinal length of the hybrid automatic transmission 8. In this exemplary implementation, none of the gears of one planetary gear set are shared with or form a gear of another one of the three planetary gear sets. In one exemplary implementation, the three planetary gear sets 112 are close coupled planetary gear sets. Each of the three planetary gear sets 112 generally includes a sun gear, a carrier supporting planet gears and a ring gear, as will also be discussed below in greater detail.

Input (e.g., torque) to the hybrid automatic transmission assembly 8 from the engine or prime mover 4 flows through the mass elastic damper 60 (which will be discussed below) and then, in one exemplary implementation, directly to the disconnect clutch 32. The input shaft 56 then, in one exemplary implementation, connects the separate launch clutch 44 as well as the second electric machine 48 to the clutch and gearbox arrangement 16, as shown, for example, in FIGS. 1, 2 and 3. In one exemplary implementation, and as illustrated in FIGS. 1, 2 and 3, the input shaft 56 is coupled to a sun gear of the second planetary gear set and is also selectively connected to one or both of two stacked rotating clutches, as will be discussed below in greater detail.

The three planetary gear sets 112 of the clutch and gearbox assembly 16 are interconnected in connection with the five torque transmitting devices. In one exemplary implementation, the clutch and gearbox assembly 16 includes only five torque transmitting devices. In this exemplary implementation, the five torque transmitting devices include two rotating clutches 122, 128 and three stationary/grounded clutches or brakes 132, 136, 140. In one exemplary implementation, one of the three stationary/grounded clutches or brakes 136 is a controllable selectable one way clutch (SOWC), as will be discussed below in greater detail.

The three planetary gear sets 112 include a first, second and third planetary gear sets 148, 152, 156. In this regard, and with reference to the third planetary gear set 156, which is positioned between the transmission output 164 and the second planetary gear set 152, the sun gear 172 is connected for common rotation with a connecting member 176 that is connected to clutch brake 140. The ring gear 180 is connected for common rotation with a second connecting member 184, and the carrier 188 is connected for common rotation with third and fourth connecting members 192, 196. The fourth connecting member 196 is connected for common rotation with the output shaft (or forms the output shaft) 200 of the transmission 8.

With reference to the second planetary gear set 152, the sun gear 208 is connected for common rotation with the transmission gearbox input shaft 56, as briefly discussed above. The ring gear 212 is connected for common rotation with a fifth connecting member 216, and the carrier 220 is connected for common rotation with the second connecting member 184.

With reference to the first planetary gear set 148 positioned, in one exemplary implementation, between the second planetary gear set 152 and the hybrid module 12, the sun gear 232 is connected for common rotation with a sixth connecting member 236, which is connected to rotating clutch 122. The ring gear 240 is connected for common rotation with the third connecting member 192, and the carrier 244 is connected for common rotation with the fifth connecting member 216 and a seventh connecting member 256. The fifth connecting member 216 is connected to the ring gear of the second planetary gear set 152 (as discussed above) and rotating clutch 128. The seventh connecting member 256 is connected to grounded clutch 136, which, in the exemplary implementation illustrated, is the selectable one way clutch (SOWC) discussed above. An eighth connecting member 260 connects the second rotating clutch 122 and the sixth connecting member 236 to the clutch brake 132.

As briefly discussed above, the torque transmitting devices provide for selective interconnection of shafts or connecting members, members of the three gearbox planetary gear sets and/or the transmission housing. For example, the rotating clutch 122 is selectively engageable to connect the sixth connecting member 236 with the transmission input 56, and the rotating clutch 128 is also selectively engageable to connect the fifth connecting member 216 with the transmission input. The clutch brake 132 is selectively engageable to connect the eighth connecting member 260, and thus the sixth connecting member 236 to the transmission housing 20 so as to restrict the eighth and sixth connecting members (which can be one member) from rotating relative to the transmission housing 20. The second clutch brake 136 in the form of the selectable one way clutch (SOWC) is selectively engageable to connect the seventh connecting member 256 to the transmission housing 20 so as to restrict the seventh connecting member 256 from rotating relative to transmission housing 20 in a first rotational direction, and will be discussed in greater detail below. It will be appreciated by those skilled in the art that the transmission includes other features and components for use in its overall operation.

Figure 7:
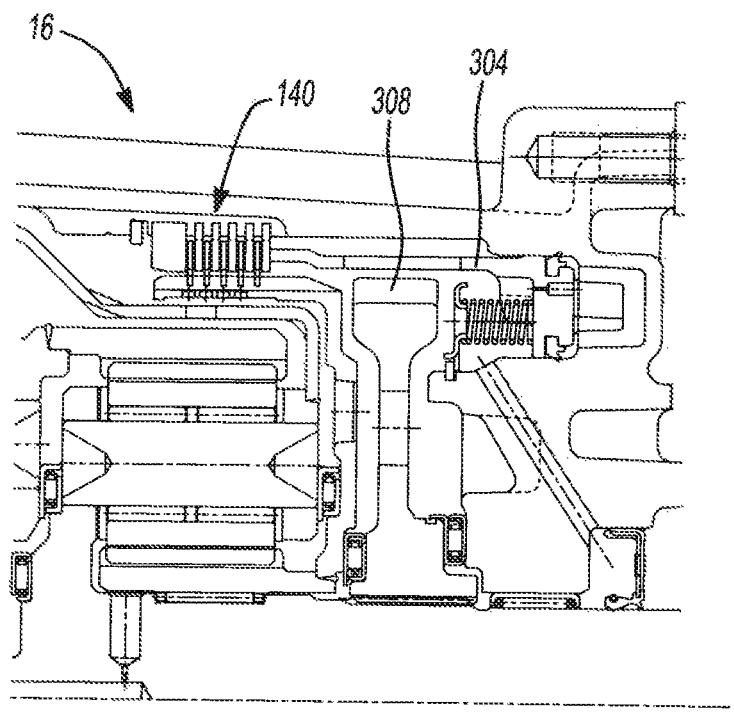
FIG. 7 is an enlarged view of the encircled area 7 in FIG. 3 in accordance with the principles of the present application.
Figure 8:
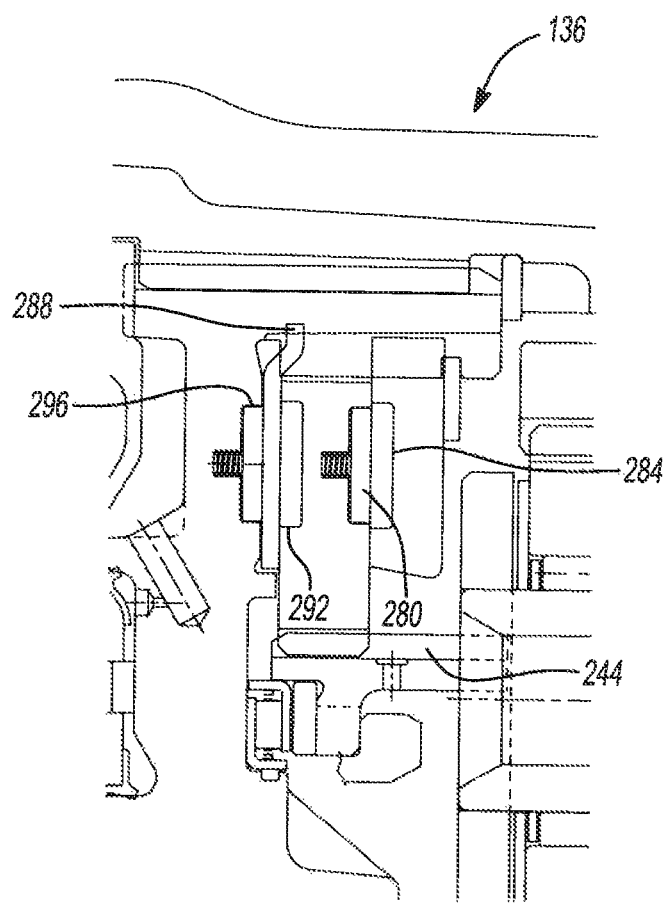
FIG. 8 is an enlarged view of the encircled area 8 in FIG. 3 in accordance with the principles of the present application.
Figure 9:
FIG. 9 is a table illustrating exemplary clutch application and shift sequences for the example hybrid automatic transmission of FIG. 1 in accordance with the principles of the present application.

With particular reference to FIGS. 3 and 7, application of clutch brake 140 will now be discussed in greater detail. In one exemplary implementation, the clutch brake 140 is applied with a piston 304 that reaches over a park gear 308 of the transmission 8. This arrangement provides for, among other benefits, more compact packaging and less axial or longitudinal length of transmission 8 (if the park gear 308 and piston 304 were arranged axially spaced apart from each other).

Figure 5:
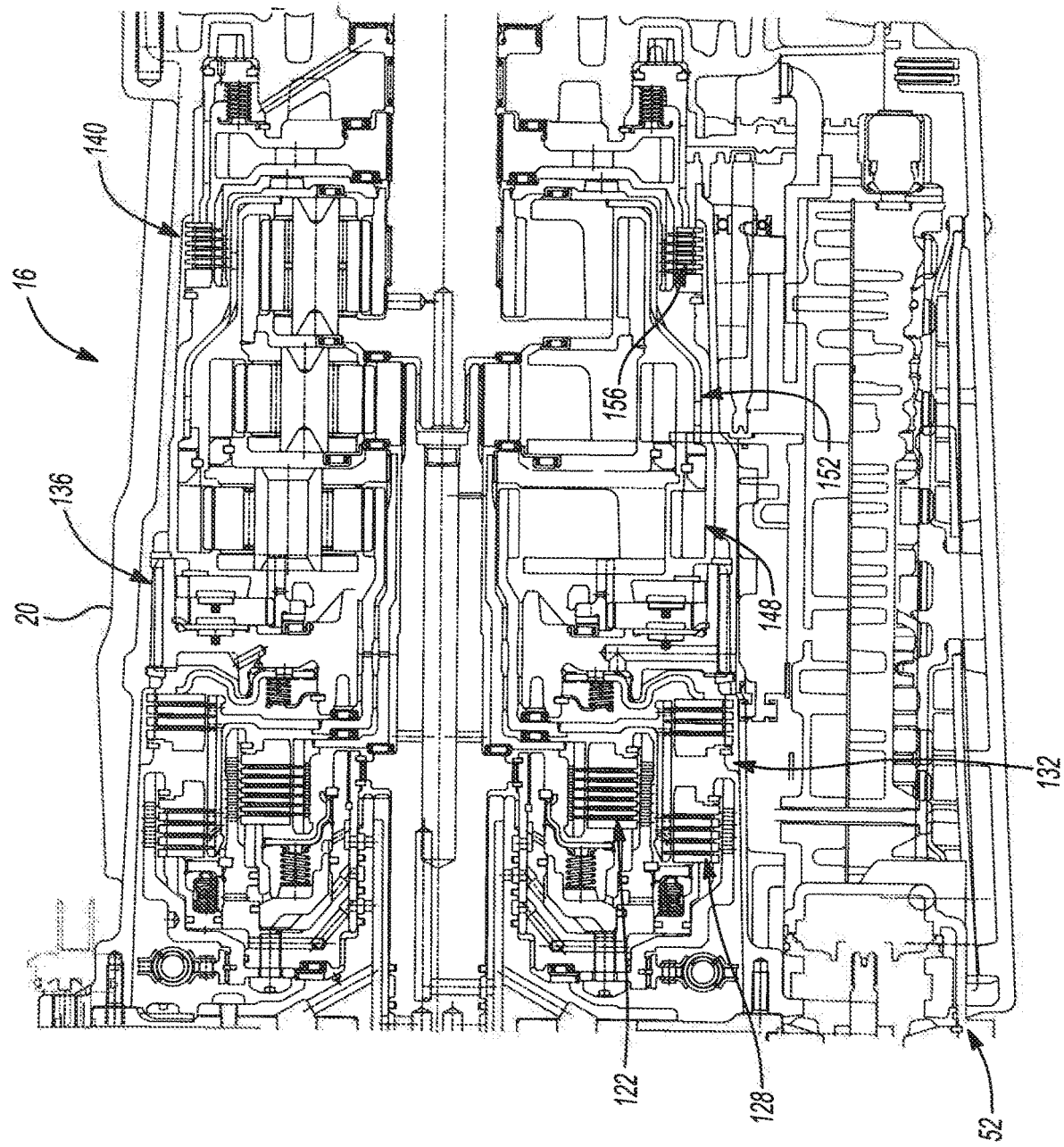
FIG. 5 is an enlarged view of the encircled area 5 in FIG. 3 in accordance with the principles of the present application.

Referring now to FIGS. 2, 3 and 5, the rotating clutches 122 and 128 will now be discussed in greater detail. In one exemplary implementation, the rotating clutches 122, 128 are radially stacked such that they axially overlap one another. In the exemplary implementation illustrated, the clutch 122 is radially outboard of radially inboard clutch 128 so that it is, from a perspective of looking radially outward from a radial center of transmission 8, positioned on top of clutch 128. In one exemplary implementation, clutch 122 is positioned directly radially above clutch 128 such that there are not any intervening elements therebetween. In one exemplary implementation, clutch 122 is positioned entirely over clutch 128 such that there is complete axial overlap of clutch 122 with clutch 128, thereby providing for more efficient packaging and a reduction in axial length of transmission 8.

The disconnect and launch clutches 32, 44 will now be discussed in greater detail in connection with general operation of the hybrid automatic transmission assembly 8. In one exemplary implementation and as briefly discussed above, the launch clutch 44 and the disconnect clutch 32 are separate clutches, controlled by the controller 64 or the like, and are connected in series for common rotation with the same shaft or connecting member 100 associated therewith. This shaft or connecting member 100 is coupled to the carrier 90 of the first electric machine arrangement planetary gear set 36 at one end and to the launch clutch 44 at its second opposite end. As discussed above, the second electric machine arrangement 48 is coupled to the transmission input shaft 56 proximate the selectable connection of this shaft to the launch clutch 44.

The disconnect clutch 32 is controllable via the controller 64 or the like to selectively engage and disengage the engine 4 and electric machine 40 and associate planetary gearing 36 from the remainder of the transmission 8. In other words, it can be controlled to disconnect the electric machine 40, gear set 36 and clutch and gearbox assembly 16 from the engine. The disconnect clutch 32 may also be utilized for improved noise vibration and harshness (NVH). For example, the disconnect clutch 32 may be controlled to be slipped, as needed, to mitigate NVH inputs, such as during an electric vehicle (EV) mode (discussed below).

The launch clutch 44 is a separate and separately selectively engageable clutch from the disconnect clutch 32 and provides for, among other modes and control features, tractive effort to the wheels and recuperation of energy. For example, the launch clutch 44 can be used to separate the clutch and gearbox system 16 from the first electric machine arrangement 40 while keeping the disconnect clutch 32 selectively engaged so as to use the engine 4 and first electric machine 40 independently of the remainder of the transmission to charge the associated battery or batteries 62 of the vehicle 2. The controller 64 or the like is used to control operation of the disconnect and launch clutches 32, 44 as well as the engine 4, transmission 16, first and second motors 40, 48 and the torque transmission devices of transmission 16.

Returning to the above-discussed vehicle operating modes, and with reference to use of the disconnect and launch clutches 32, 44, the EV modes include single EV motor modes and a dual EV motor mode. In the single EV motor mode using the second electric machine 48, this motor can be used as the only traction and energy recuperation motor (through regenerative braking) for propulsion of the associated vehicle 2. In this mode, the disconnect clutch 32 and the launch clutch 44 are open or disengaged and the engine 4 is off.

In the single EV motor mode using the first electric machine 40, this motor can also be used as the only traction and energy recuperation motor (through regenerative braking) for propulsion of the associated vehicle 2. In this mode, the second electric machine 48 spins as it is connected to the input shaft 56 of the transmission 16, but it does not contribute mechanically in power delivery or recuperation to the wheels through the transmission 16. In this mode, the disconnect clutch 32 is disengaged and the launch clutch 44 is engaged and the engine 4 is off.

In the dual EV motor mode, both the first and second electric machines 40, 48 are used in varying degrees for traction and energy recuperation as determined by the vehicle hybrid operating system for efficiency and power requirements. In this mode, the disconnect clutch 32 is disengaged and the launch clutch 44 is engaged and the engine 4 is off.

The engine on/hybrid modes of operation include various combinations of usage of one or both electric machines 40, 48 in connection with the engine 4, as discussed below in greater detail. One engine on mode includes use of the engine 4 in connection with both electric motors 40, 48 being used as tractive devices (e.g., parallel mode). In this mode, both the disconnect clutch 32 and the launch clutch 44 are engaged. Another engine on mode again includes use of the engine 4 and both electric motors 40, 48, but in this mode, one of the motors is used as a tractive device and the other is used as an energy recuperation device (another parallel mode). In this mode, both clutches 32, 44 are again engaged. Yet another engine on mode includes use of the engine 4 and both motors 40, 48, but in this mode, both motors are used as energy recuperation devices. The engine 4 can simultaneously power the wheels through the fixed gear transmission 16. In this mode, both clutches 32, 44 are engaged.

Another engine on/hybrid mode of operation includes a series mode of operation. In this mode, the engine 4 is on and the first electric machine 40 is connected to the engine 4 through engagement of the disconnect clutch 32. The launch clutch 44 is controlled to remain disengaged and the powertrain operates in a series mode with the first electric machine 40 acting as a regeneration device powered by the engine 4 and the second electric machine 48 using the energy from the first electric machine 40 to provide tractive effort to the wheels through the transmission 16.

For charging the battery 62 when the vehicle 2 is stopped or stationary, the disconnect clutch 32 is controlled to be engaged and the launch clutch 44 is controlled to be disengaged. In one exemplary implementation, both the launch and disconnect clutches 32, 44 are rotating clutches. In one exemplary implementation, the launch clutch provides robust cooling capacity as a rotating clutch and the disconnect clutch is provided in a wet disconnect clutch layout.

Turning now to the SOWC 136, this clutch operates i) as a normal one way clutch for first to second and second to first transmission shifts, ii) in an overrun configuration for second to sixth gears, and is locked with torque capacity for reverse and first gears. For example, the SOWC 136 provides a locked mode for reverse gear and manual first gear engine braking. The SOWC 136, in the normal mode, provides passive control of the release and apply of the clutch to improve the first to second and second to first shift feel of the transmission. Use of the SOWC 136 as discussed above and in place of a conventional clutch brake and/or conventional one-way clutch also reduces drag and improves fuel economy.

In one exemplary implementation, the SOWC 136 is coupled to the carrier 244 of the first planetary gear set 148 and, as discussed above can operate as a typical or conventional one-way clutch where it is locked in one direction and overruns or freewheels in the other direction, or can be selectively engaged or actuated to be locked in both directions, where it is then grounded to transmission housing 20. With particular reference to FIG. 5, the SOWC 136 includes forward struts 280 operably associated with stationary forward notch plate 284, which is splined to housing 20. This forms the function of a conventional one way clutch, but with different componentry and positioning due to its use with the selectable portion discussed below. With additional reference to FIG. 8 and the clutch/brake actuation table 286 illustrated, it can be seen that the forward strut and notch plate arrangement, which is operably associated with carrier 244, freewheels in the reverse and second through sixth gears and is locked in first gear. This is because the carrier 244 spins in the freewheeling direction in reverse and second through sixth gears, and spins in the opposite direction in first gear, which locks this system of the SOWC 136.

The selectable portion or system of the SOWC 136 includes an actuatable selector plate 288, a reverse notch plate 292 and selectable reverse struts 296, noting that FIG. 5 illustrates the selector plate 288 in a non-actuated or engaged state. It can also be seen with reference to FIG. 8 that the selectable reverse struts 296 are not selected or engaged in second through sixth gears. However, the selectable reverse struts 296 are engaged in reverse gear such that the SOWC 136 is locked in both rotating directions. Further, the selectable reverse struts 296 are also engaged in first gear such that the SOWC is locked and the forward struts are also transmitting torque. Finally, FIG. 8 also illustrates that two clutches need to be engaged to generate power flow in each of first through sixth and reverse gears.

As briefly discussed above, the damper system of the hybrid automatic transmission assembly includes a separate mass elastic damper 60 positioned on the primary side with the engine 4 output to the disconnect clutch 32 of the transmission. This position of the damper 60 provides for better pre-conditioning of the input signal to the transmission 16.

Figure 6:
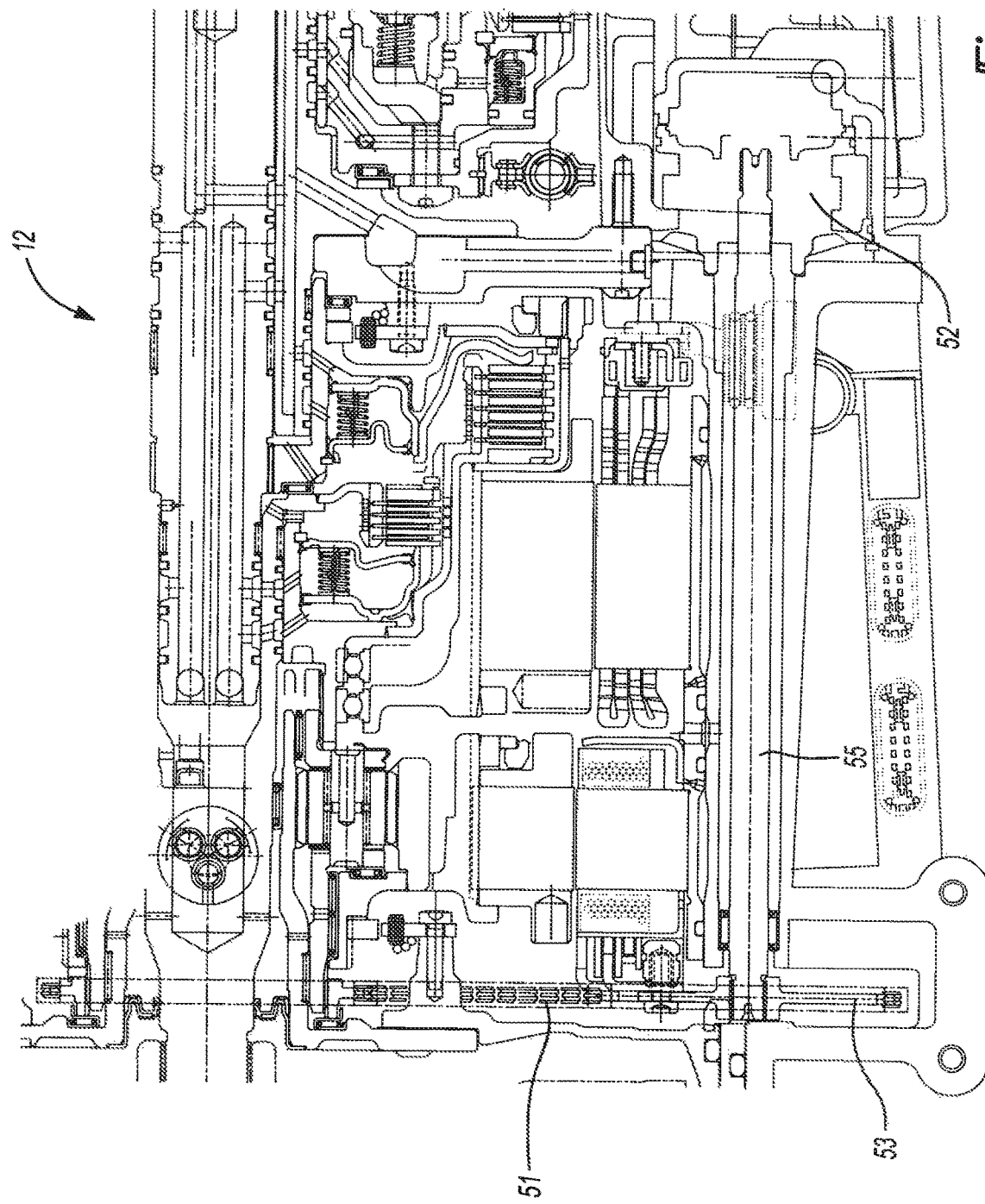
FIG. 6 is an enlarged view of the encircled area 6 in FIG. 3 in accordance with the principles of the present application.

In one exemplary implementation and with particular reference to FIGS. 2-3 and FIG. 6, the pump 52 is driven by the engine 4 and/or the first electric machine 40 and is independent of transmission input speed. For example, the pump 52 can be driven by the engine 4 when the engine 4 is on and the disconnect clutch 32 is engaged, and/or by the first electric machine 40 directly or through a gear set. The arrangement provides for a pump drive sprocket 51 to be driven independent of transmission input shaft 56 speed when the launch clutch 44 is disengaged or slipping while carrying torque.

With particular reference to FIG. 6, the pump 52 is located at least partially within the clutch and gearbox assembly 16, while its drive chain 53 and drive shaft 55 are located in the hybrid module 12. The drive chain 53 is coupled to the carrier assembly 90, as discussed above, and the drive shaft is positioned at a bottom of the hybrid module 12, below the first and second electric machines 40, 48.

In this exemplary implementation, the pump drive sprocket or gear 51 is kinematically located such that it can be connected to the engine 4 by applying the disconnect clutch 32 and it has a fixed connection to the first electric machine directly or through the planetary gear set 36. In this arrangement, the second electric machine 48 cannot drive the pump when the launch clutch 44 is open.

When the vehicle 2 is being propelled by the second electric machine 48 and the launch clutch 44 is open and the disconnect clutch 32 is applied or engaged, the engine 4 can independently drive the pump 52 at the required pump speed (noting that the first electric machine 40 is rotating and can be contributing torque if required). When the engine 4 and/or the first electric machine 40 help propel the vehicle 2 in addition to the second electric machine 48, the launch clutch 44 will be slipped as required to maintain the required pump 52 speed at low vehicle speeds.

The hybrid automatic transmission arrangement also includes, in one exemplary implementation, valve body/controls and a power inverter module (PIM) integrated with the transmission. In one exemplary implementation, such integration is not bolt-on, but is fully integrated into the transmission housing.

The described transmission designs allow the hybrid powertrain to achieve much higher efficiency and higher capability in EV mode by allowing to select either or both the electric machines. This allows the system to be designed where each of the electric machines can be smaller in power but collectively have much bigger power throughput. The electric machines are designed to be scalable and thus fit a wide variety of vehicles with diverse requirements from, for example, performance cars to trucks. The described transmission designs also allow the system to selectively use either of the electric machines for engine start/stops and torque blending (through opportunity charging and tractive power) functions which is a unique characteristic over EVT or single motor hybrid powertrains. This architecture also allows the use of both electric machines to capture energy during decelerations through regenerative capture without any drag (impediment) from the engine.

The described transmission designs allow for selective use of either of the electric machines for regeneration or traction through the use of clutches (DC & LC). In contrast, previous P1f–P2 concepts have been used where one of the motors (much smaller in size) is connected to the engine through a FEAD system. This causes the P2 machine to be sized much bigger which adversely impacts fuel economy and EV range. Also the P1F machine working through the FEAD system gets power limited due to FEAD constraints. Addition of a FEAD system also has adverse impact on throughput efficiency. Due to these concerns, the P1F machine is impractical for tractive purposes and its use is limited to engine start/stops and opportunity charging. P1F moreover, cannot be used effectively for regenerative capture as all the energy always has to be passed through the engine (which ends up absorbing a significant portion). Electrically Variable Transmission (EVT) concepts also have the inherent trait of allowing only one of the motors to perform engine start/stop or restrict torque blending (positive contribution for wheel torque) through both motors.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A multi-speed hybrid automatic transmission for a vehicle, comprising:
   a transmission input shaft and output shaft;
   a hybrid module coupled to the input shaft;
   a multi-speed gearbox assembly coupled to the hybrid module and the transmission output shaft;
   the hybrid module including:
      a first electric motor coupled to and underdriven by a module planetary gear set;
      a second electric motor coupled to an output of the hybrid module;
      a disconnect clutch controllable to selectively couple a separate torque generating device to the hybrid module, the disconnect clutch connected to the module planetary gear set and selectively to the transmission input shaft, which forms an input to the hybrid module;
      a launch clutch controllable to selectively couple the hybrid module to the gearbox assembly, the launch clutch coupled for common rotation with the disconnect clutch and selectively to the output of the hybrid module, which forms an input to the gearbox assembly; and
      a pump drive coupled for common rotation with the module planetary gear set;
   the gearbox assembly including:
      three planetary gear sets and five torque transmitting devices operable to generate six forward speed ratios and reverse, wherein one of the five torque transmitting devices is a selectively controllable one-way clutch;
      the gearbox assembly input coupled to a second planetary gear set of the three planetary gear sets and selectively coupled to one of two rotating clutches of the five torque transmitting devices; and
      an output of the gearbox assembly, which forms the transmission output shaft, and is coupled to a third planetary gear set of the three planetary gear sets; and
   wherein the hybrid transmission is configured to be controlled to operate in an engine only propulsion mode, two electric only propulsion modes, a hybrid propulsion mode and a battery charging mode.

2. The transmission of claim 1, wherein the module planetary gear set is a simple planetary gear set having a sun gear connected to ground, a carrier connected to the disconnect clutch for common rotation therewith, and a ring gear connected to a rotor of the first electric motor.

3. The transmission of claim 1, wherein the disconnect clutch and the launch clutch are separate clutches spaced apart from and connected to each other for common rotation, the launch clutch being positioned after or downstream of the disconnect clutch.

4. The transmission of claim 1, wherein the pump drive includes a gear arrangement connected to the carrier and a chain drive coupling the gear arrangement to a drive shaft, which is connected to a pump, and wherein the pump drive gear arrangement and chain drive is positioned upstream of the disconnect clutch, the launch clutch, and the first and second electric motors.

5. The transmission of claim 1, wherein a member connects the disconnect clutch, the launch clutch, and a carrier of the module planetary gear set common rotation and the pump drive is connected to the carrier for common rotation therewith.

6. The transmission of claim 5, wherein:
the disconnect clutch and the launch clutch are both rotating clutches
the disconnect clutch and the launch clutch are both directly connected to the member;
the disconnect clutch is directly connected to the carrier and selectively directly coupled to the hybrid module input;
the launch clutch is directly connected to the member and selectively directly coupled to the hybrid module output;
a rotor of the first electric motor is directly connected to a ring gear of the module planetary gear set; and
a rotor of the second electric motor is directly connected to the hybrid module output.

7. The transmission of claim 1, wherein:
an output from the engine or another torque generating device forms the only input and torque carrying connection to the hybrid module via the input shaft;
the output of the hybrid module forms the only input to the gearbox assembly and the only torque carrying connection between the hybrid module and the gearbox assembly;
wherein the first and second electric motors, module planetary gear set, and launch and disconnect clutches are housed only in the hybrid module such that the hybrid module is configured to be scalable with different size electric motors and planetary gear set ratios without changing the gearbox assembly to which the hybrid module is connected thereto.

8. The transmission of claim 4, wherein the launch clutch is controlled to be disengaged and the disconnect clutch is controlled to be engaged such that the pump is configured to be driven by the engine or first electric motor and is independent of a rotating speed of a shaft that forms the hybrid output and gearbox assembly input.

9. The transmission of claim 1, wherein the disconnect clutch and the launch clutch are controlled to facilitate the engine only operating mode, the battery charging mode, the two electric only propulsion modes and the hybrid propulsion mode utilizing torque provided by the engine and/or the first and second electric motors.

10. The transmission of claim 9, wherein:
the disconnect and launch clutches are controlled to be actuated or engaged, and the first and second electric motors are controlled to free-spin to provide the engine only operating mode; and
the disconnect clutch is controlled to be engaged and the launch clutch is controlled to be disengaged to provide the battery charging mode where the engine and first electric motor are utilized independent of the gearbox assembly to charge a battery of the vehicle.

11. The transmission of claim 9, wherein the two electric only propulsion modes include a single motor propulsion mode and a dual motor propulsion mode;
in the single motor propulsion mode using the second electric motor, the disconnect and launch clutches are controlled to be disengaged and the engine is off;
in the single motor propulsion mode using the first electric motor, the disconnect clutch is controlled to be disengaged and the launch clutch is controlled to be engaged and the engine is off; and
in the dual motor propulsion mode, the disconnect clutch is controlled to be disengaged and the launch clutch is controlled to be engaged, the engine is off, and both electric motors are controlled to generate torque.

12. The transmission of claim 9, wherein the hybrid propulsion mode includes:
a parallel mode, where the engine and both electric motors are controlled to generate torque and the launch and disconnect clutches are both engaged;
a series mode, where the disconnect clutch is controlled to be engaged and the launch clutch is controlled to be disengaged, the first electric motor is driven by the engine to function as a regeneration device, and the second electric motor is powered by regeneration energy from the first electric motor to generate torque to drive the vehicle via the gearbox assembly.

13. The transmission of claim 9, wherein the disconnect clutch is controlled to be engaged and the launch clutch is initially controlled to slip when launching the vehicle in either of the engine only operating mode or the hybrid propulsion mode.

14. The transmission of claim 1, wherein one of the five torque transmitting devices is a clutch brake that is applied with a piston that reaches over a park gear of the hybrid transmission, the clutch brake selectively coupled to the third planetary gear set.

15. The transmission of claim 1, wherein:
the transmission is a rear wheel drive transmission;
the six forward speed ratios include only six forward speed ratios;
the hybrid module includes only two clutches and only two electric motors;
the three planetary gear sets includes only the three planetary gear sets; and
the five torque transmitting devices include only the five torque transmitting devices.

16. The transmission of claim 1, wherein the three planetary gear sets are each simple planetary gear sets and are each axially spaced apart from each other along a longitudinal length of the gearbox assembly.

17. The transmission of claim 1, wherein:
the selectable one way clutch is coupled to a carrier of the first planetary gear set and selectively coupled to ground, and
wherein the selectable one way clutch includes passive forward struts and selectively engageable reverse struts, the forward struts passively operate to overrun in second to sixth forward speed ratios with the reverse struts being controlled to be off.

18. The transmission of claim 17, wherein the reverse struts are selectively actuated to lock the selectable one way clutch for the first forward speed ratio and reverse.

19. The transmission of claim 15, wherein the five torque transmitting devices include the two rotating clutches, the clutch brake that is applied with a piston that reaches over the park gear, another clutch brake, and the selectable one way clutch.

20. The transmission of claim 1, wherein the two rotating clutches are radially stacked relative to the gearbox input and each other, and wherein the two rotating clutches include a first rotating clutch actuated for fourth, fifth and sixth forward speed ratios, and a second rotating clutch actuated for third and fifth forward speed ratios and reverse.

21. The transmission of claim 20, wherein the second rotating clutch is stacked radially outboard of and over the first rotating clutch such that the first rotating clutch axially overlaps the second rotating clutch along a longitudinal length of the transmission.

\* \* \* \* \*